(No Model.)
L. DIETRICH.
HORSESHOE.
No. 501,562. Patented July 18, 1893.
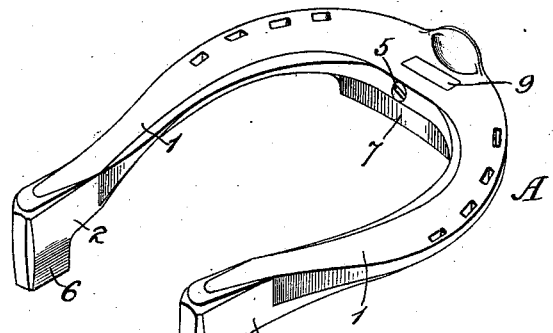
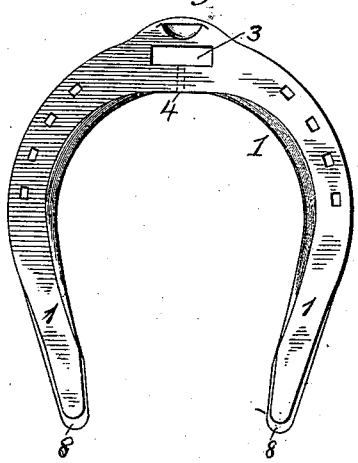
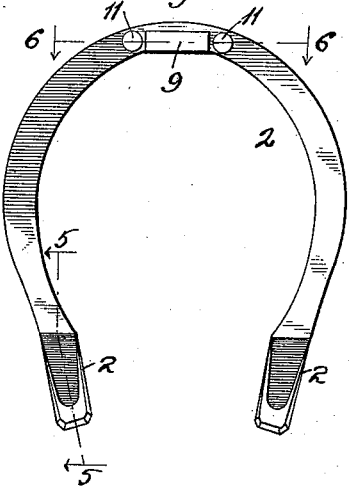
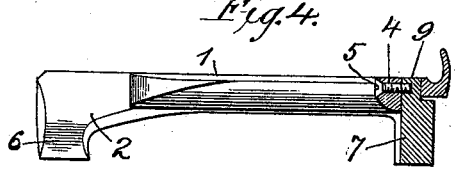
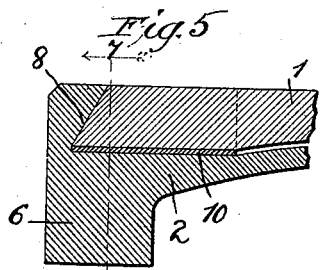
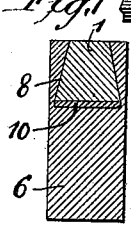
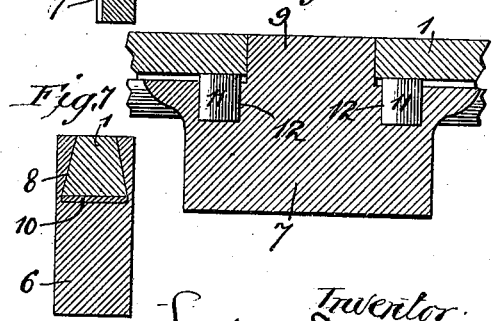
Witnesses:
Wm. M. Rheem
Wm. F. Henning
Inventor
Ludwig Dietrich
By Lot Kennedy
Att'ys.

UNITED STATES PATENT OFFICE.

LUDWIG DIETRICH, OF CHICAGO, ILLINOIS.

HORSESHOE.

SPECIFICATION forming part of Letters Patent No. 501,562, dated July 18, 1893.

Application filed January 3, 1893. Serial No. 457,055. (No model.)

*To all whom it may concern:*

Be it known that I, LUDWIG DIETRICH, a subject of the Emperor of Germany, residing at Chicago, in the county of Cook and State of Illinois, have invented certain new and useful Improvements in Horseshoes; and I do hereby declare the following to be a full, clear, and exact description of the invention, such as will enable others skilled in the art to which it appertains to make and use the same.

This invention relates to a novel construction in horseshoes, the object being to provide a device of this kind which can be changed from a rough shod to a smooth shod shoe without removing the piece of the shoe that is nailed to the hoof of the horse.

The invention consists in the features of construction and combinations of parts hereinafter fully described and specifically claimed.

In the accompanying drawings illustrating my invention,—Figure 1 is a perspective view of a horseshoe constructed in accordance with my invention. Fig. 2 is a plan view of the piece or member that is nailed to the horse's hoof. Fig. 3 is a plan view of the removable or interchangeable member. Fig. 4 is a sectional view through the toe of the shoe. Figs. 5 and 6 are sectional views taken respectively on the lines 5—5 and 6—6 of Fig. 3. Fig. 7 is a sectional view on the line 7—7 of Fig. 5.

Referring now to said drawings, A indicates as a whole the horseshoe consisting essentially of two members 1 and 2. The member 1 is adapted to be secured to the hoof of a horse and for this purpose is provided with the nail holes and flat top face in the usual manner. The lower face of said member 1 is also plain and similar to a light horseshoe. The heels of said member 1 are, however, beveled or inclined upwardly so that at the top they are smaller than at the bottom, as clearly shown in section in Figs. 5 and 7. At the toe of the shoe is made an upright opening 3 which passes through the shoe and a screw-threaded aperture 4 is made in the member 1 in the rear of the opening 3 to receive a screw-threaded bolt or pin 5 to be referred to hereinafter.

The removable or interchangeable member in its general shape resembles a horseshoe and is provided with the usual heel and toe calks 6 and 7 which may be either blunt or pointed according to the use to which the shoe is to be put. The upper face of the member 2 corresponds to the lower face of the member 1 so that they can lie flat against each other, as shown in Fig. 1, and the means for securing these members together consist of two dovetailed recesses 8 at the heel portion of the member 2 and a lug 9 at the toe portion of the same. The dovetailed recesses 8 are open at their front ends so that the dovetailed ends of the member 1 can enter said recesses therethrough. The lug 9 on the toe of the member 2 is adapted to enter and fit within the opening 3 in the member 1, as shown in Figs. 4 and 6, and in the rear base of said lug 9 is made a screw-threaded opening into which the screw bolt 5 can enter to hold said member 2 in place. Between the two members are interposed elastic cushions which serve to cushion the shoe when a horse throws its foot forcibly against a hard surface. These cushions consist of a flat piece of flexible or elastic material indicated by 10 and located within the recesses 8 between the heels of the member 1 and the member 2. Other cushions are also arranged at the toe of the shoe and comprise the flexible pieces or cushions 11 located within recesses 12 in the upper face of the member 2 and projecting above the same so as to encounter the lower face of the member 1.

In use the member 1 of the horseshoe is nailed to the horse's hoof in the usual manner, while the member 2 is removably secured to said member 1 by first inserting the heels of the member 1 into the recesses 8 of the member 2 and then forcing the lug 9 of said member 2 into the opening 3 of member 1. The screw pin is then secured into place as shown in Fig. 4. It will be noted, however, that said pin 5 can be omitted and by making the lug 9 to fit tightly within the opening 3 this will prevent the separation of the parts. By the use of a horseshoe of this construction the necessity of removing the shoe from the horse's foot when it is desired to make any change in the character of the shoe, is obviated, for instance, if the member 2 that is secured to the hoof is smooth or has blunt calks, and it is desired to give the horse what is known as a "rough shod," all that is necessary is to substitute for the member 2 with the blunt calks another member with pointed calks. In the same way light and heavy shoes can be put upon the horse's hoof without removing the nails of the shoe, as is usually necessary.

I claim as my invention—

1. A horseshoe comprising two members, a member 1 adapted to be nailed to a horse's hoof, having dovetailed heels and an opening 3 at its toe, a member 2 having dovetailed recesses at its heels and a lug 9 at its toe, and a pin 5 located within an aperture in said member 1 adjacent to the opening 3 and passing into an opening in said lug 9, substantially as described.

2. A horseshoe comprising two members 1 and 2, the said member 1 having dovetailed heels and an opening 3 at its toe, the said member 2 having dovetailed recesses 8 at its heels and a lug 9 at its toe, and cushions interposed between said members 1 and 2, substantially as described.

3. A horseshoe comprising two members 1 and 2, the said member 1 having dovetailed heels and an opening 3 at its toe, the said member 2 having dovetailed recesses 8 at its heels and a lug 9 at its toe, cushions interposed between said members 1 and 2, and a pin 5 located within an aperture in said member 1 adjacent to the opening 3 and passing into an opening in said lug 9, substantially as described.

In testimony whereof I affix my signature in presence of two witnesses.

LUDWIG DIETRICH.

Witnesses:
HARRY COBB KENNEDY,
RUDOLPH W. LOTZ.